3,345,352
CATALYTIC PROCESS FOR THE THERMAL
DEGRADATION OF POLYOLEFINS
Joseph J. Baron, Jr., Morris Plains, and Julius P. Rakus,
Bernards Township, Somerset County, N.J., assignors
to Allied Chemical Corporation, New York, N.Y., a
corporation of New York
No Drawing. Filed Feb. 21, 1964, Ser. No. 346,403
13 Claims. (Cl. 260—93.7)

This invention relates to the thermal degradation of polyolefins to produce relatively low molecular weight hydrocarbon polymers, useful, for example, as wax substitutes and blending agents, coating compositions and, in general, in fields where hydrocarbon resins and waxes find utility. This invention relates more particularly to processes for the thermal degradation of highly crystalline homopolymers or copolymers of ethylene, propylene, butene-1 and other olefins, particularly olefins having up to 6 carbon atoms.

The thermal degradation or depolymerization of relatively high molecular weight polyolefins in the absence of oxygen to obtain lower molecular weight polymers has been investigated by a number of researchers. When polyolefins are subjected to high temperature degradation, for example at temperatures above about 250° C., several competing reactions take place such as depropagation reactions involving polymer fragmentation, intermolecular transfer and decomposition reactions, etc. When depropagation reactions, also termed "unzipping" of the chain radical, take place much more rapidly than the other reactions, monomer formation results without the desired decrease in average weight of the residual polymers. This, of course, is objectionable when polyolefins are subjected to thermal degradation to obtain lower molecular weight polymers because it results in poor yields of the desired polymers and frequently interferes with the obtainment of polymers having the desired molecular weight range.

It is a principal object of the present invention to improve polyolefin thermal degradation procedures to make such procedures more economical to carry out, for example by providing procedures which result in the desired lower molecular weight polymers at lower temperatures or in markedly shorter time periods at a given temperature, or both, resulting in a savings in the heat requirements of the processes.

Another object of this invention is to provide a process of thermally degradating crystalline high molecular weight polyolefins to provide highly crystalline polyolefins of desired lower average molecular weight having an appreciably narrower range of molecular weight molecules forming the polymer than in the starting higher molecular weight polyolefins subjected to thermal degradation.

Another object of this invention is to provide a catalytic process for effecting the thermal degradating of crystalline polyolefins employing catalysts which catalyze the thermal degradation to produce lower molecular weight polymers, which catalytic process minimizes formation of monomer.

Still another object of this invention is to provide such catalytic process employing catalysts which do not require special handling precautions to retain their catalytic activity, and which are inexpensive and hence particularly useful in producing wax-like low molecular weight polymers for use in coating compositions including petroleum wax coating compositions.

Other objects and advantages of the present invention will be apparent from the following detailed description thereof.

Among the highly crystalline polyolefins are linear polyethylenes and stereoregular polymers of olefins, including alpha-olefins having 3 or more carbon atoms. The stereoregular polymers are those in which the alkyl groups pendent to the main hydrocarbon polymer chain exhibit a regular steric order in relation to each other. The proportion of stereoregular polymers in a polyolefin is frequently referred to as the isotactic content of the polyolefin. This isotactic content is commonly determined by ascertaining the proportion of the polyolefin left after extraction with diethyl ether; the portion of the polyolefin which dissolves in the diethyl ether is the amorphous or atactic fraction.

Polymerization of olefins in the presence of Ziegler type and other catalysts gives mixtures comprising a crystalline polyolefin fraction, an amorphous fraction and a partially crystalline fraction. By extracting such mixtures with diethyl ether, acetone or heptane, and thus effecting the removal of atactic material, polyolefins can be produced having various degrees of crystallinity.

The processability of polyolefins, for example, their formation into useful products by extrusion, blow molding, calendering, injection molding, blending with other resins or waxes, is dependent among other properties on the softening point of the polyolefin and melt viscosity. The viscosity of a molten polyolefin in general is proportional to its molecular weight. For many uses it is important that the molecular weight be much lower than that of the highly crystalline polyolefin produced by the polymerization process. Certain olefins such as propylene and butene polymerize directly only to high molecular weight, highly crystalline polymers. Controlled polymerization thereof to obtain low molecular weight polymers results in non-crystalline oils and greases which cannot be used in certain fields, such for example as the coating field where high crystallinity is a required property.

In accordance with this invention crystalline polyolefins having an isotactic content of at least 60% and preferably having a molecular weight above 250,000, are heated in the presence of from 0.075% to 10% of a catalyst, hereinafter defined, in the absence of oxygen to a temperature of from 275° to 450° C. or higher, particularly when using superatmospheric pressure conditions, preferably to a temperature of from 300° to 400° C., for a period which will vary depending upon the temperature, catalyst and the amount of catalyst used, which time period is adequate to produce the desired reduction in molecular weight. Employing the preferred catalysts hereinafter disclosed in amounts and at temperatures within the upper portion of the above-mentioned respective ranges, the time of heating can be as little as five minutes; using an amount of catalyst in the lower portion at the lower temperatures, within the aforesaid range of 0.075% to 10%, the time of heating can be from four to five hours.

In this specification all percentages are given on a weight basis.

Employing the catalyst thermal degradation process of the present invention, desired lower molecular weight polyolefins can be obtained either at appreciably lower temperatures or by heating for markedly shorter periods of time as compared with thermal degradation procedures in the absence of the catalyst, and this with minimization of monomer formation.

The heating of the polymer, catalyst mixture can be carried out in any suitable closed equipment such as a batch reactor or continuous reactor through which the mixture of polymer and catalyst is passed continuously for the necessary residence time to produce at the temperature of operation the desired lower molecular weight polyolefin. The heating can be carried out under vacuum, at ambient pressures or under superatmospheric pressure conditions. In the case of batch operations at ambient or superatmospheric pressure conditions the heating can be carried out under a blanket of nitrogen or other oxygen-free atmosphere. Heating under vacuum and removing the air present in the reactor before commencing the heating results in the desired oxygen-free atmosphere.

If desired the mixture of catalyst and polymer can be stirred or agitated during the heating; stirring the mixture during the heating aids in heat transfer and contact between catalyst and polymer.

The catalyst used can be one or a mixture of (1) an oxide or (2) carbonate of an alkali metal, alkaline earth metal, or a heavy metal, namely, antimony, bismuth, cadmium, chromium, copper, iron, lead, mercury, tantalum, titanium, thallium, vanadium and zinc.

Catalyst which are insoluble in the polymer can be removed from the low molecular weight polymer by subjecting the molten residual polymer mixture from the degradation to filtration or centrifugal separation to remove the solid catalyst.

The following examples are given to exemplify the invention without, however, limiting this invention to these illustrative examples.

Molecular weights are determined by solution viscosity measurements (see R. Chiang, Journal Polymer Science, 28, 235 (1958)).

In the examples which follow the indicated polyolefins containing the specified catalyst were placed in glass tubes 1 inch x 5 inches which then were purged with nitrogen gas, evacuated to an absolute pressure of 0.2 to 0.6 millimeters of mercury and placed in openings in an aluminum block heated to 300° C. in the case of the examples given in Tables I and II and to the specified temperatures in the case of the other examples. In the case of the examples given in Table I below, the tubes were removed after two and four hours, and in the case of the examples of Table II below, the tubes were removed after four hours. The heated material was allowed to cool under a blanket of nitrogen. When cooled to room temperature the contents of the tubes were removed and the molecular weights determined.

In certain series of thermal degradation runs, data on which is given hereinafter, a sample of the polyolefin used but without the catalyst was subjected to the same treatment under the same conditions and the molecular weight of the resultant product determined.

The starting polyolefin employed in all of the examples of Tables I and II was polybutene-1 having a molecular weight of 320,000. In the series of examples of Tables I and II, 5% of the indicated powdered catalyst was mixed with this polyolefin.

TABLE I

| Ex. No. | Catalyst | Molecular Weight | |
|---|---|---|---|
| | | After 2 Hours | 4 Hours |
| | None | 255,500 | 215,000 |
| 1 | $CdCO_3$ | 170,000 | 110,000 |
| 2 | $Pb_3O_4$ | 79,500 | 63,000 |
| 3 | $Sb_2O_3$ | 59,000 | 47,000 |
| 4 | $Tl_2O_3$ | 31,000 | 25,000 |

TABLE II

| Ex. No. | Catalyst | Molecular Weight After 4 Hours |
|---|---|---|
| | None | 215,000 |
| 5 | $Bi_2O_3$ | 165,000 |
| 6 | $CrO_3$ | 130,000 |
| 7 | CuO | 150,000 |
| 8 | $Cu_2O$ | 150,000 |
| 9 | $Fe_2O_3$ | 180,000 |
| 10 | HgO | 170,000 |
| 11 | $Li_2CO_3$ | 170,000 |
| 12 | MgO | 180,000 |
| 13 | PbO | 100,000 |
| 14 | $Ta_2O_5$ | 160,000 |
| 15 | $TiO_2$ | 180,000 |
| 16 | $V_2O_3$ | 170,000 |
| 17 | ZnO | 140,000 |

In Table III which follows data is given on a series of examples carried out as above described in connection with the examples of Table I on the same polybutene heated to 300° C. except that the amount of catalyst was reduced to 1% and the duration of heating was one or two hours, as indicated in the table.

TABLE III

| Ex. No. | Catalyst | Molecular Weight | |
|---|---|---|---|
| | | After 1 Hour | 2 Hours |
| | None | 285,000 | 255,000 |
| 18 | $Tl_2O_3$ | 46,000 | |
| 19 | $Sb_2O_3$ | 150,000 | 47,000 |
| 20 | $Pb_3O_4$ | 180,000 | |

In Table IV, data is given on a series of examples carried out as above described in connection with examples of Table I on the same polyolefin under the same conditions except that the amount of catalyst was reduced to 0.2% and the duration of the heating was 1 or 2 hours as indicated in Table IV.

TABLE IV

| Ex. No. | Catalyst | Molecular Weight | |
|---|---|---|---|
| | | After 1 Hour | After 2 Hours |
| | None | 285,000 | 255,000 |
| 21 | $Tl_2O_3$ | 190,000 | 140,000 |
| 22 | $Sb_2O_3$ | 130,000 | 125,000 |
| 23 | $Pb_3O_4$ | | 200,000 |

In Table V data is given on a series of examples involving the thermal degradation of polybutene-1 under conditions the same as in the case of the examples of Table I except that the amount of catalyst was 1%, the temperature was raised to 350° C. and the duration of the heating was one or two hours, as indicated in this table.

TABLE V

| Ex. No. | Catalyst | Molecular Weight | |
|---|---|---|---|
| | | After 1 Hour | 2 Hours |
| | None | 155,000 | 88,000 |
| 24 | $Tl_2O_3$ | 18,000 | |
| 25 | $Sb_2O_3$ | 20,000 | 8,900 |
| 26 | $CdCO_3$ | 35,000 | |

In Table VI data is given on a series of examples involving the thermal degradation of polybutene-1 under conditions the same as in the case of the examples in Table I except that the temperature was 350° C., the amount of catalyst was reduced to 0.2% and the duration of the heating was one or two hours as indicated in this table.

TABLE VI

| Ex. No. | Catalyst | Molecular Weight | |
|---|---|---|---|
| | | After 1 Hour | After 2 Hours |
| | None | 155,000 | 88,000 |
| 27 | $Tl_2O_3$ | 20,000 | 18,000 |
| 28 | $Sb_2O_3$ | 20,000 | |
| 29 | $Pb_3O_4$ | 34,500 | |
| 30 | $CdCO_3$ | | 19,000 |

In Table VII data is given on the thermal degradation of linear polyethylene having a molecular weight of 1,750,000 admixed with the catalysts and in the amount thereof indicated, heated to 350° C. for two hours, following the procedure used in the case of the examples of Table I.

TABLE VII

| Ex. No. | Catalyst | Molecular Weight After 2 Hours |
|---|---|---|
|  | None | 140,000 |
| 31 | 1% $Tl_2O_3$ | 74,000 |
| 32 | 5% $Tl_2O_3$ | 62,000 |
| 33 | 1% $Sb_2O_3$ | 97,000 |
| 34 | 5% $Sb_2O_3$ | 85,000 |

In Table VIII data is given on a series of examples carried out as above described in connection with the examples of Table I except that the polyolefin was highly crystalline polypropylene having a molecular weight of 330,000 to which was added the amount of the catalyst noted in this table and the resultant mixture heated for two hours at 350° C.

TABLE VIII

| Ex. No. | Catalyst | Molecular Weight After Two Hours |
|---|---|---|
|  | None | 200,000 |
| 35 | 1% $Tl_2O_3$ | 16,500 |
| 36 | 5% $Tl_2O_3$ | 10,000 |
| 37 | 1% $Sb_2O_3$ | 32,500 |
| 38 | 1% $Pb_3O_4$ | 38,000 |
| 39 | 5% $Pb_3O_4$ | 22,000 |
| 40 | 5% $CdCO_3$ | 67,000 |

Example 41 involved the thermal degradation of crystalline polybutene-1 having a molecular weight of 660,000 mixed with 0.2% $Tl_2O_3$. The mixture was heated for two hours at 350° C. The polymer thus obtained had a molecular weight of 66,000.

Example 42 involved the thermal degradation of polybutene having a molecular weight of 660,000 admixed with 0.2% thallium oxide ($Tl_2O_3$) and the mixture heated to 375° C. for one hour under a pressure of from 1.5 to 2.5 mm. of mercury. This example was carried out in two parts. In one part the mixture was stirred and in the other part the mixture was heated without stirring. The molecular weight of the products obtained from both parts was substantially the same, namely, about 19,000. Frequently stirring of the mixture during the heating tends to give a product of lower molecular weight than results when the mixture of polyolefin and catalyst is not stirred or agitated during the heating.

In Table IX which follows is given data on a series of examples involving thermal degradation of polybutene having a molecular weight of 820,000 employing 0.2% of the indicated catalysts at a temperature of 375° C., the mixture being heated for the indicated time periods.

TABLE IX

| Ex. No. | Catalyst, Percent | Pressure, mm. Hg | Time, hours | Yield, Percent | Molecular Weight |
|---|---|---|---|---|---|
| 43 | 0.2 $Tl_2O_3$ | 1.3–1.5 | 2 | 85 | 7,850 |
| 44 | 0.2 $Sb_2O_3$ | 1.3–1.5 | 2 | 82 | 11,000 |
| 45 | 0.2 $Tl_2O_3$ | 1.6–2.6 | 1⅚ | --- | 3,950 |

Example 45 involved the heating of 100 grams of the polybutene whereas examples 43 and 44 involved the heating of only 10 grams of the polymer.

It will be noted that the present invention provides catalytic processes for effecting the thermal degradation of polyolefins to produce desired lower molecular weight polymers at lower temperatures or requiring markedly shorter heating periods at a given temperature or at lower temperatures for shorter heating periods, thus resulting in a saving in the heat requirements of the processes. The polymers produced uniformly and invariably have an appreciably narrower range of molecular weight molecules than in the starting higher molecular weight polyolefins subjected to thermal degradation. Hence the polymer products have better processability; because of the narrow molecular weight distribution of the molecules in the polymer product produced by the processes of this invention the polymers have lower melt viscosities which is highly desirable, e.g., in the production of coating compositions employed in waterproofing paper or paperboard such as used in the manufacture of cartons and wrappers where the coating compositions must be applied at temperatures which will not deleteriously affect the fiber substrate.

Since certain changes in carrying out the thermal degradation process of this invention can be made without departing from its scope, it is intended that all matter contained in the above description, including the examples, shall be interpreted as illustrative and not in a limiting sense.

What is claimed is:

1. The polyolefin thermal degradation process which comprises mixing a crystalline polyolefin with 0.075% to 10% by weight of a degradation catalyst from the group consisting of (1) oxides and (2) carbonates of (a) alkali metals, (b) alkaline earth metals, and (c) heavy metals from the group consisting of antimony, bismuth, cadminum, chromium, copper, iron, lead, mercury, tantalum, titanium, thallium, vanadium and zinc, and mixtures thereof; heating the resulting mixture in an atmosphere substantially free of oxygen to a temperature of from 275° to 450° C. for a minimum time period of at least 5 minutes when at the highest catalyst concentration, highest catalyst degradation activity, and most active temperature conditions, said minimum time increasing with decreasing temperature, catalyst concentration and catalyst degradation activity; and recovering a polyolefin having a molecular weight reduced by at least 45% compared to the molecular weight of the starting polyolefin.

2. The process of claim 1 in which the starting polyolefin is a polymer of an alpha-olefin of 3 to 4 carbon atoms having isotactic content of at least 60%.

3. The process of claim 1 in which the starting polyolefin has a molecular weight in excess of 250,000.

4. The process as defined in claim 1, in which the catalyst is cadmium carbonate.

5. The process as defined in claim 1, in which the catalyst is lead oxide.

6. The process as defined in claim 1, in which the catalyst is antimony oxide.

7. The process as defined in claim 1, in which the catalyst is thallium oxide.

8. The process as defined in claim 1, in which the catalyst is copper oxide.

9. The process as defined in claim 1, in which the catalyst is lithium carbonate.

10. The process as defined in claim 1, in which the catalyst is magnesium oxide.

11. The process as defined in claim 1, in which the catalyst is titanium oxide.

12. The process as defined in claim 1, in which the catalyst is vanadium oxide.

13. The process as defined in claim 1, in which the catalyst is zinc oxide.

References Cited

UNITED STATES PATENTS 2,981,727  4/1961  Boeke et al. _____ 260—94.9

JOSEPH L. SCHOFER, *Primary Examiner.*

L. EDELMAN, *Assistant Examiner.*